July 8, 1924.  
M. TRÈVE  
1,500,689  
FASTENER FOR ELECTRIC INSULATORS  
Filed April 18, 1922
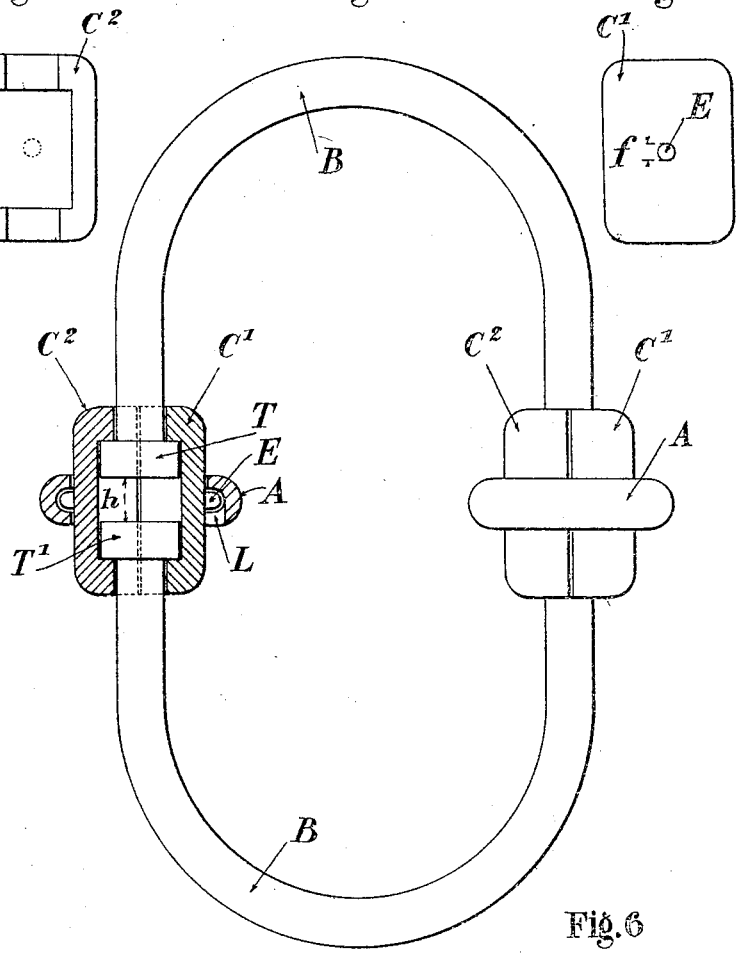
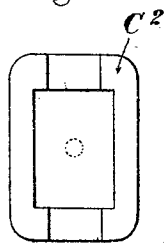
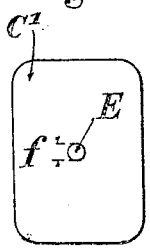
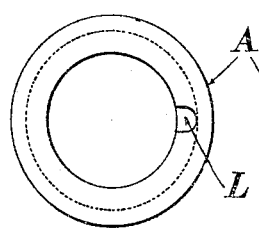
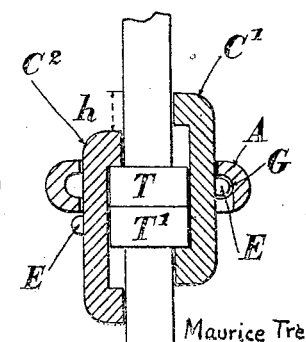
Maurice Trève  
INVENTOR;  
By  
his Attorney.

Patented July 8, 1924.

1,500,689

UNITED STATES PATENT OFFICE.

MAURICE TRÈVE, OF PARIS, FRANCE.

FASTENING FOR ELECTRIC INSULATORS.

Application filed April 18, 1922. Serial No. 554,432.

*To all whom it may concern:*

Be it known that I, MAURICE TRÈVE, citizen of the French Republic, residing at Paris, in the Republic of France, has invented new and useful Improvements in Fastenings for Electric Insulators, of which the following is a specification.

This invention has for its object an improved device particularly adapted for use in attaching electric insulators to catenary suspensions.

The improved fastening comprises two metal half shells adapted to contain the ends of the members to be connected and a locking ring which acts to hold the said half-shells detachably attached to each other.

A form of construction of the improved device is shown by way of example in the accompanying drawing in which:

Fig. 1 is an elevation partly in section of the whole fastening device.

Figs. 2 and 3 show respectively the inner and outer views of one of the half-shells forming a part of the fastening.

Figs. 4 and 5 show respectively in plan and diametral section the ring used to connect the two half-shells to each other.

Fig. 6 shows the method of carrying out the mounting of the device.

As shown in the drawing, the two wire straps B forming a part of the suspension for an electric insulator are provided at each of their ends with a cylindrical head or boss T or $T^1$. Said heads T, $T^1$ are engaged and retained between two semi-cylindrical half-shells $C^1$, $C^2$ which are each provided on the outer side with a stud E; the height of the inner recess of these half-shells is greater than the sum of the heights of the heads T and $T^1$ of the straps. The two half-shells $C^1$ and $C^2$ are connected together after mounting by a ring A having an inner annular groove G such that the stud E can slide loosely therein. A notch L is formed in the inner edge of the ring for the introduction of the stud E into the inner groove G.

The device is assembled as follows: The two metal straps B having been engaged through the corresponding recesses in the insulators, the ring A is placed on one of the straps and the heads T, $T^1$ are brought opposite each other. The two heads T and $T^1$ are then placed between the two half-shells $C^1$ and $C^2$, taking care to slide these two half-shells on each other, so that the two heads come into contact. The whole device is then disposed, as shown in Fig. 6, the two half-shells being displaced vertically with reference to each other by a certain quantity $h$. This quantity $h$ is at least equal to the height $f$ of the studs E (Fig. 3) increased by the thickness $m$ of the wall of the ring A (Fig. 5) plus a certain play for the mounting.

The two half-shells being in the above mentioned position, one slides the ring A on the whole, so that the notch L comes opposite the stud E of the shell $C^1$ and said stud enters within the ring into the groove G. The said ring is then turned through 180° so as to bring the notch L opposite the stud E of the shell $C^2$. At this moment, it suffices to raise up the half-shell $C^2$ by causing its stud to enter the notch and to slightly turn this ring so that the connection between these two half-shells will be effected.

The fastening device is now securely closed, for the heads T and $T^1$ always tend to separate from each other and to hold the two half shells $C^1$ and $C^2$ in the position of Fig. 1 by the sole action of the weight of the pieces, and the ring A which has but a single notch for the two studs E provided on the two shells together, cannot become released.

The dismounting is very simple since it suffices to bring together the two heads T and $T^1$ and to effect in the opposite sense the operations above indicated for the mounting.

Having now described my invention, what I claim as new and desire to secure by Letters Patent is:

A detachable fastening device for suspensions of electric insulators comprising two coaxial hanging members provided with a head at their corresponding ends, two semi-cylindrical half-shells forming together a recess in which the heads of the supporting members are retained, the heads being able to slide axially in said recess, a stud on the outer surface of each half-shell and a ring adapted to surround the two half-shells and having along its whole inner periphery an annular groove of constant cross section for receiving said stud, the ring having in one of its inner edges only one notch through which each of the said studs is adapted to pass successively when mounting the fastening device.

In testimony whereof I have signed my name to this specification.

MAURICE TRÈVE.